Nov. 10, 1931.  E. G. McDONALD  1,831,073
BRAKE OPERATING MEANS
Filed May 7, 1928
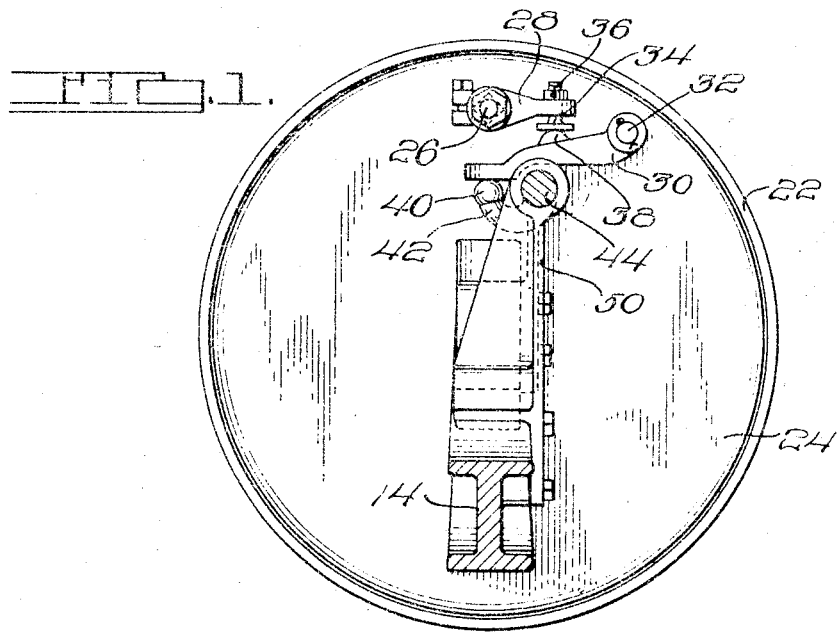
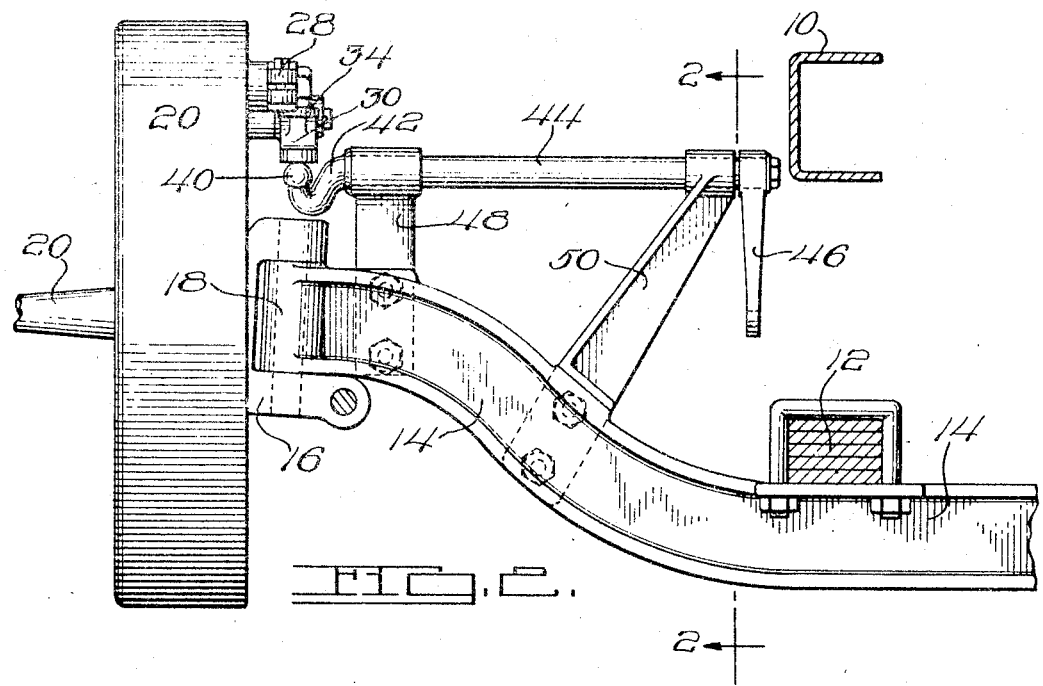
INVENTOR
Eugene G. McDonald
BY
Jn. W. McConkey
ATTORNEY Patented Nov. 10, 1931

1,831,073

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MEANS

Application filed May 7, 1928. Serial No. 275,685.

This invention relates to brakes, and is illustrated as embodied in novel operating mechanism for a front wheel automobile brake. An object of the invention is to provide a simple mechanism which is easily adjusted.

Preferably there are a pair of levers, shown pivoted at opposite ends and having a thrust part through which the one operates the other and which may be the adjustment if desired. When used on a brake for a swiveled front wheel, these two levers swivel with the wheel and a portion of one of them may be arranged to travel along the swivelling axis, for engagement with operating means such as a third lever on the end of a shaft supported on the axle or the like.

The above and other objects and features of the invention, including various novel and desirable details of construction, will be apparent from the following description of one illustrative embodiment shown in the accompanying drawings, in which:

Figure 1 is a vertical transverse section showing the left front brake and associated parts in rear elevation; and Figure 2 is a section on the line 2—2 of Figure 1, and showing the brake in inside elevation.

The automobile chassis shown includes the usual frame 10, supported by springs 12 on a front axle 14 having a knuckle 16 swiveled thereto by means such as a king-pin 18. A wheel (not shown), rotatably mounted on the spindle 20 of the knuckle 16, is provided with the brake drum 22 closed by a stationary support such as a backing plate 24 carried by the knuckle 16. The friction means of the illustrated brake is housed within the drum 22, and is operated by a camshaft 26 or the like.

The novel applying means for operating the shaft 26, or its equivalent, preferably includes two levers 28 and 30 pivoted at their opposite ends. Lever 28 is clamped fixedly on the end of shaft 26, while lever 30 is mounted on a fixed pivot 32. I prefer to provide an adjustable thrust part or set-screw 34, shown threaded through the lever 28 and locked by a nut 36, and which may have a flat and relatively large head engaged by a rounded thrust projection 38 formed on the lever 30.

When used for a brake on a swiveled wheel, as illustrated, I prefer to form the end portion of lever 30 as a flatened spade moving along the swiveling axis of the wheel, and engaged by means such as an integral ball 40 at the end of a third lever 42 formed on a shaft 44. Ball 40 is arranged so that its center moves substantially along the swiveling axis of the wheel in applying the brake. Shaft 44 is provided with an operating arm 46 and is shown journaled in two brackets 48 and 50 bolted to the axle 14.

While one illustrative embodiment has been described in detail, it is not my intention to limit the scope of the invention to that particular embodiment, or otherwise than by the terms of the appended claims.

I claim:

1. Brake applying means comprising, a swivelled brake support, a shaft having a lever at its end, a second lever fulcrumed at one end on the support and acted upon by the first lever, and a third lever fulcrumed immediately adjacent the free end of said second lever and acted on by the said second lever.

2. Brake applying means comprising, a swiveled brake support, a shaft having a lever at its end, a second lever fulcrumed at one end on the support and acted upon by the first lever, and a third lever fulcrumed immediately adjacent the free end of said second lever and acted on by the said second lever, said last-mentioned levers being arranged immediately adjacent each other and one above each other and in the same plane.

In testimony whereof, I have hereunto signed my name.

EUGENE G. McDONALD.